(12) United States Patent
Joseph et al.

(10) Patent No.: US 12,036,990 B2
(45) Date of Patent: Jul. 16, 2024

(54) VEHICULAR CONTROL SYSTEM WITH CONTROLLED VEHICLE STOPPING AND STARTING AT INTERSECTION

(71) Applicant: Magna Electronics Inc., Auburn Hills, MI (US)

(72) Inventors: Harold E. Joseph, Brampton (CA); Muhammad Mohteshim Khan, Brampton (CA); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 478 days.

(21) Appl. No.: 16/949,920

(22) Filed: Nov. 20, 2020

(65) Prior Publication Data

US 2021/0155241 A1 May 27, 2021

Related U.S. Application Data

(60) Provisional application No. 62/939,243, filed on Nov. 22, 2019.

(51) Int. Cl.
*B60W 30/18* (2012.01)
*B60R 1/12* (2006.01)
(Continued)

(52) U.S. Cl.
CPC ............. *B60W 30/181* (2013.01); *B60R 1/12* (2013.01); *B60R 11/04* (2013.01); *B60W 30/18154* (2013.01); *B60W 50/14* (2013.01); *G06V 10/255* (2022.01); *G06V 10/56* (2022.01); *G06V 20/582* (2022.01); *B60R 2001/1253* (2013.01); *B60W 2050/146* (2013.01); *B60W 2420/403* (2013.01); *B60W 2554/408* (2020.02); *B60W 2555/60* (2020.02)

(58) Field of Classification Search
CPC ........ B60W 30/181; B60W 30/18154; B60W 50/14; B60W 2050/146; B60W 2420/42; B60W 2554/408; B60W 2555/60; B60R 1/12; B60R 11/04; B60R 2001/1253; G06V 10/255; G06V 10/56; G06V 20/582
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

*Primary Examiner* — Sihar A Karwan
(74) *Attorney, Agent, or Firm* — HONIGMAN LLP

(57) ABSTRACT

A vehicular vision system includes a camera viewing exterior of the vehicle and capturing image data, and an electronic control unit (ECU) having an image processor for processing captured image data to detect presence of objects in the view of the camera. The ECU, responsive to processing of captured image data, determines presence of an intersection controlled by at least one stop indicator, with one stop indicator designated for the lane along which the vehicle is traveling. The ECU determines a right-of-way order of other vehicles at the intersection relative to the equipped vehicle and determines when the equipped vehicle has the right-of-way based on the determined right-of-way order. The ECU provides an indication to the driver of the equipped vehicle when the equipped vehicle has the right-of-way.

20 Claims, 3 Drawing Sheets

(51) Int. Cl.
  *B60R 11/04* (2006.01)
  *B60W 50/14* (2020.01)
  *G06V 10/20* (2022.01)
  *G06V 10/56* (2022.01)
  *G06V 20/58* (2022.01)

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,824,281 B2 | 11/2004 | Schofield et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,480,149 B2 | 1/2009 | DeWard et al. |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 8,256,821 B2 | 9/2012 | Lawlor et al. |
| 9,036,026 B2 | 5/2015 | Dellantoni et al. |
| 9,146,898 B2 | 9/2015 | Ihlenburg et al. |
| 9,487,159 B2 | 11/2016 | Achenbach |
| 9,575,160 B1 | 2/2017 | Davis et al. |
| 9,596,387 B2 | 3/2017 | Achenbach et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,871,971 B2 | 1/2018 | Wang et al. |
| 9,896,039 B2 | 2/2018 | Achenbach et al. |
| 10,671,076 B1* | 6/2020 | Kobilarov .............. G08G 1/166 |
| 10,684,626 B1* | 6/2020 | Martin .................. G08G 1/166 |
| 2009/0295181 A1 | 12/2009 | Lawlor et al. |
| 2009/0303077 A1* | 12/2009 | Onome ............ G08G 1/096791 348/148 |
| 2010/0245066 A1 | 9/2010 | Sarioglu et al. |
| 2012/0062743 A1* | 3/2012 | Lynam ................. B60W 10/20 348/148 |
| 2012/0218412 A1 | 8/2012 | Dellantoni et al. |
| 2013/0222592 A1 | 8/2013 | Gieseke |
| 2014/0160284 A1 | 6/2014 | Achenbach et al. |
| 2014/0218529 A1 | 8/2014 | Mahmoud et al. |
| 2014/0226012 A1 | 8/2014 | Achenbach |
| 2014/0375476 A1 | 12/2014 | Johnson et al. |
| 2015/0015713 A1 | 1/2015 | Wang et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0327398 A1 | 11/2015 | Achenbach et al. |
| 2015/0352953 A1 | 12/2015 | Koravadi |
| 2016/0036917 A1 | 2/2016 | Koravadi et al. |
| 2016/0210853 A1 | 7/2016 | Koravadi |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2018/0268695 A1* | 9/2018 | Agnew ................ B60K 28/066 |
| 2019/0049964 A1* | 2/2019 | Jang ........................ G06V 10/75 |
| 2019/0339382 A1 | 11/2019 | Hess et al. |
| 2020/0001779 A1* | 1/2020 | Alexander ........... G06V 20/584 |
| 2020/0278684 A1* | 9/2020 | Naserian ............ G05D 1/0221 |
| 2020/0317224 A1* | 10/2020 | Yano ...................... G01S 13/931 |
| 2020/0394911 A1* | 12/2020 | Harmel ................ G08G 1/0145 |
| 2021/0046924 A1* | 2/2021 | Caldwell ........... B60W 60/0027 |

\* cited by examiner

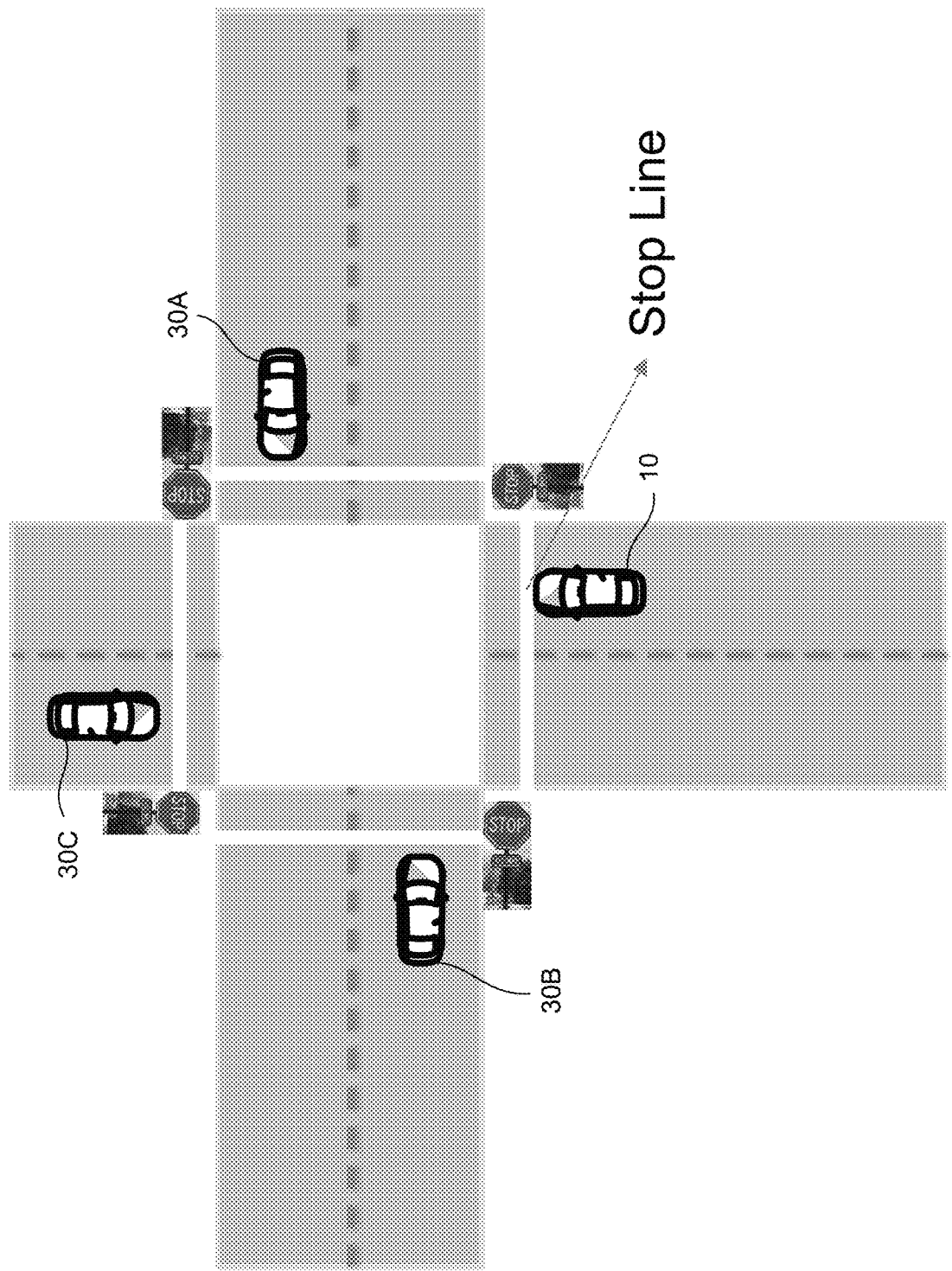

VEHICULAR CONTROL SYSTEM WITH CONTROLLED VEHICLE STOPPING AND STARTING AT INTERSECTION

CROSS REFERENCE TO RELATED APPLICATION

The present application claims the filing benefits of U.S. provisional application Ser. No. 62/939,243, filed Nov. 22, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides an electronic control unit (ECU) with electronic circuitry and associated software. The ECU, responsive to processing of image data captured by the camera, determines presence of an intersection controlled by at least one stop indicator or signaling or indicating device or structure (e.g., a stop sign or a stop light). One of the at least one stop signals controls or applies to or is designated for the lane the equipped vehicle is currently navigating. The ECU, responsive to determining presence of the intersection, determines presence of a stop line associated with the stop signal and stops the vehicle at the stop line. The ECU determines a right-of-way order of vehicles at or near or approaching the intersection and monitors the intersection to determine when the equipped vehicle has the right-of-way based on the determined right-of-way order. The ECU, responsive to determining that the equipped vehicle has the right-of-way, provides an indication to the driver of the equipped vehicle that the equipped vehicle has the right-of-way.

These and other objects, advantages, purposes and features of the present invention will become apparent upon review of the following specification in conjunction with the drawings.

BRIEF DESCRIPTION OF THE DRAWINGS

FIG. 3 is a plan view of a four-way intersection with stop lines.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
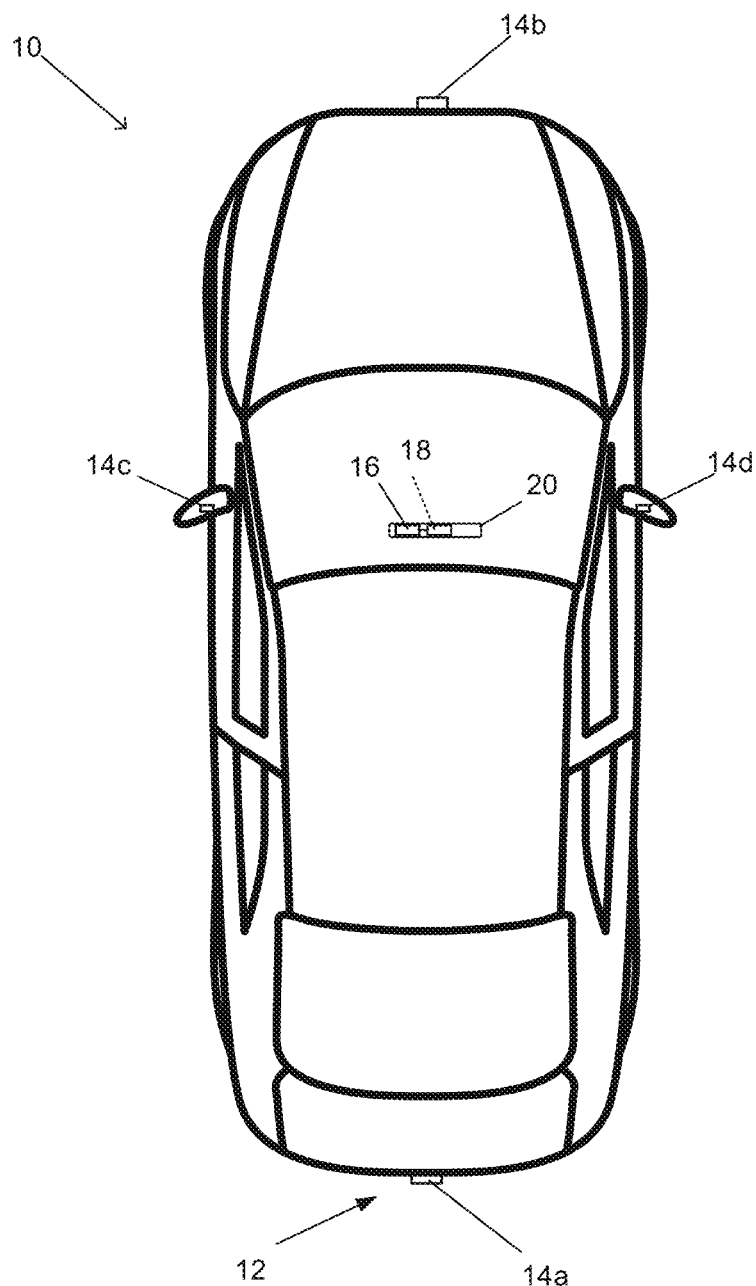
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Stop-controlled intersections (i.e., intersections with one or more "STOP" signs, stop lights, flashing lights, etc.) are often difficult for a driver to navigate. For example, vehicle priority must be determined. That is, the driver must determine who has the current right-of-way (i.e., who should enter the intersection next) and when it is safe to cross the intersection. Busy intersections with several lanes may especially be stressful for the driver.

Implementations herein are directed toward an intelligent vehicle vision system and/or driver assist system that stops automatically at a stop sign and assists the driver at an intersection (e.g., an all-way intersection, a four-way intersection, a three-way intersection, etc.) in making their turn and/or crossing the intersection.

Figure 2:
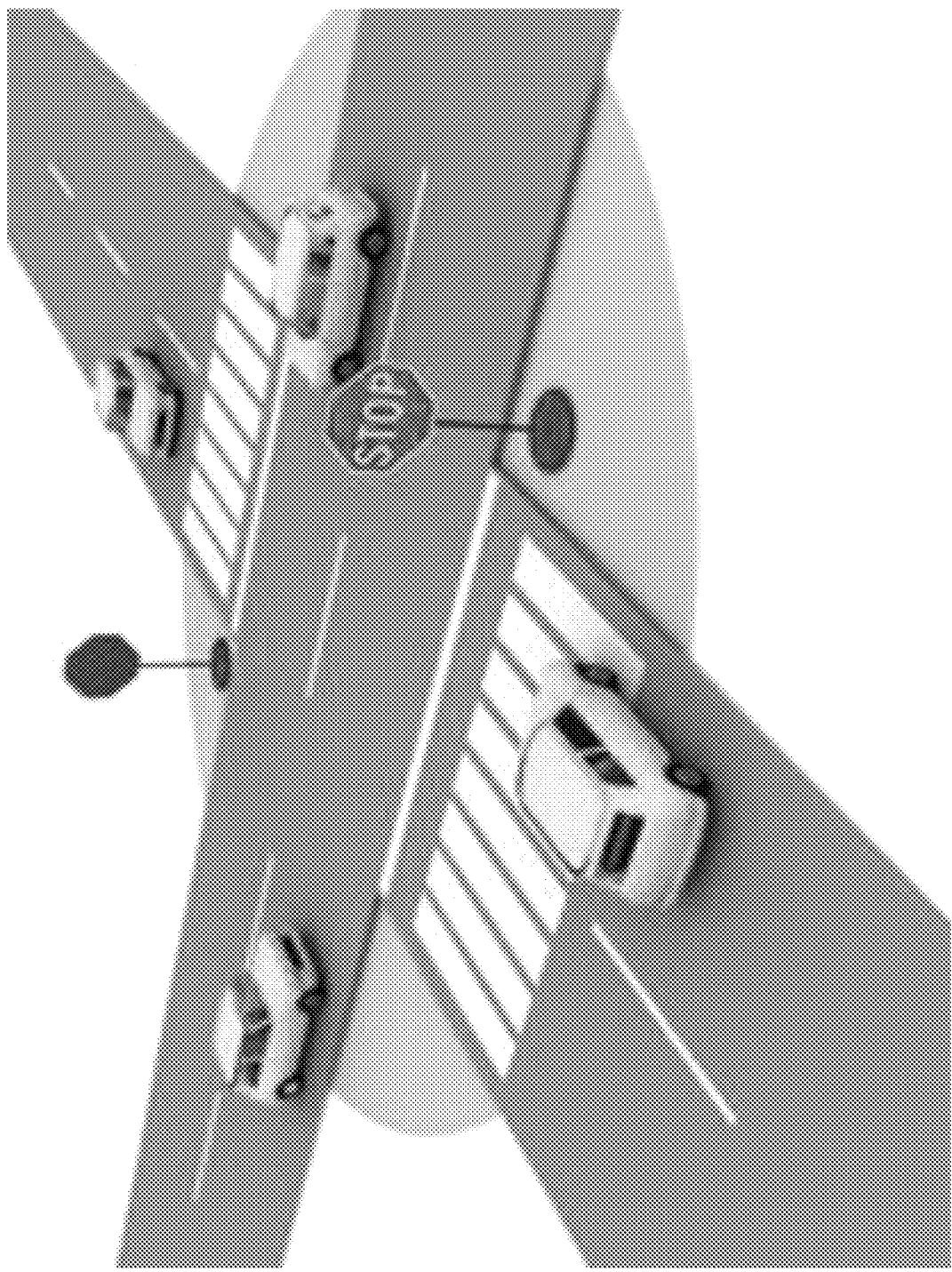
FIG. 2 is a perspective view of an intersection with stop signs.

Referring now to FIG. 2, the system may use the front viewing camera to detect an oncoming stop sign (or other signaling or indicating device or structure, such as a stop light or the like) at an intersection or junction. For example, the system may process image data captured by the camera and, via object detection and traffic sign recognition algorithms or processes, determine the presence of a stop indicator, such as a stop sign, a stop light, a flashing light (e.g., flashing yellow or red light), etc., ahead of the vehicle on the roadway the vehicle is currently travelling. Responsive to detecting a stop indicator, the vehicle may classify the junction or intersection. For example, the system may classify the intersection as an all-stop intersection, a four-way intersection, a three-way intersection, a one-way stop intersection, etc. Such classification may be achieved by processing image data of the detected stop sign (which may say "4-way stop" or "cross traffic does not stop" or other indication of the type of intersection) or the detected stop light (e.g., the color of the light, flashing lights, arrow indicators, etc.) or by processing image data to detect other stop indicators or responsive to map data or the like that may indicate the type of intersection at the current geographical location of the vehicle). The system may classify the stop indicator (stop sign, stop light, etc.) based on any of a number of features of the stop indicator such as a size, a shape, or a color of the stop indicator (e.g., the system may determine presence of a stop sign by determining a red octagonal sign and/or may utilize character recognition algorithms to determine the words of the signs, such as "4-Way Stop"). The system may supplement the image data with map data from a database based on the current geographical location of the vehicle (obtained from, for example, a global positioning system (GPS) sensor). For example, the system may determine from the map data than an oncoming intersection is a 4-way stop. The system may then determine the presence of a stop line (i.e., a line at which the vehicle is supposed to stop at the stop sign) and smoothly stop the vehicle at the stop line.

Responsive to the vehicle stopping or as the vehicle is approaching the intersection and stopping, the system may analyze all of the vehicles currently at the intersection (e.g., via processing of image data captured by the camera) and identify a right-of-way order for the vehicles (e.g., an order in which the vehicles arrived at the intersection and should be allowed to enter or cross the intersection, and taking into account that the vehicle to the right has the right-of-way when two vehicles arrive at the intersection at the same time, and taking into account that if two head-to-head vehicles arrive at the same time, the vehicle going straight through the intersection has the right-of-way). For example, and such as via processing at the ECU of image data captured by a forward viewing camera and/or of sensor data captured by a forward sensing radar sensor and/or lidar sensor of the vehicle, the ECU detects presence of one or more other vehicles at the intersection or approaching the intersection. In some examples, the system tracks which vehicles arrived at the intersection before the equipped vehicle and which vehicles arrived at the intersection after the equipped vehicle and determines that vehicles that arrived prior to the equipped vehicle have a right-of-way before the equipped vehicle and vehicles that arrive after the equipped vehicle have a right-of-way after the equipped vehicle. That is, when arriving at an intersection (such as a 4-way stop), the system may assess the right-of-way based on the most recently arriving other vehicle (i.e., the order the vehicles arrive at the intersection). In some examples, as the equipped vehicle approaches the intersection, the system monitors the intersection to determine vehicle arrival order at the intersection before the equipped vehicle arrives at the intersection.

Optionally, the system may indicate the right-of-way order (e.g., via a display within the vehicle) to the driver. For example, the system may display on the display a countdown as vehicles move through the intersection (e.g., how many vehicles left until the equipped vehicle has the right-of-way) and/or may display on the display vehicle representations (e.g., vehicle avatars) showing the determined vehicles at the intersection. The representations may indicate the right-of-way order (e.g., with text or color) so that the driver may see their current right-of-way position or order. For example, the display may indicate which vehicle currently has the right-of-way and which lanes do not stop (i.e., do not have stop signs or signals). For example, the vehicle avatars may be shown as a red color when they do not have the right-of-way, and change to green one at a time as the respective vehicle has the right-of-way. The equipped vehicle may be designated as a different color that also changes to green when the equipped vehicle has the right-of-way and may also flash or otherwise indicate to the driver that it is his or her turn to proceed through the intersection.

Referring now to FIG. 3, responsive to determining the order of the vehicles, the system determines an order position for the equipped vehicle 10. The system monitors the intersections and other cars until it is the equipped vehicle's turn to enter the intersection (i.e., until the equipped vehicle has the right-of-way). For example, the equipped vehicle 10 may stop at a four-way intersection (i.e., all four lanes entering the intersection have a stop sign) where two vehicles 30A, 30B are already stopped prior to the equipped vehicle 10 stopping at the intersection. In this situation, both the vehicle 30A and the vehicle 30B have the right-of-way over the equipped vehicle 10. If, while the equipped vehicle is waiting at the intersection, another vehicle 30C arrives at the intersection, the equipped vehicle 10 has right-of-way over the newly arrived vehicle 30C (as the equipped vehicle 10 arrived at the intersection before the newly arrived vehicle 30C). If any two vehicles arrive at the same time, the system indicates that the vehicle to the right of the other vehicle that arrives at the same time has the right-of-way or that the vehicle that is not turning (i.e., no turn signal detected by the system) has the right-of-way between two head-to-head vehicles (going in opposite directions across the intersection) that arrive at the same time. Optionally, the intersection may be a roundabout. In this example, the system may determine right-of-way based on whether a vehicle has entered the roundabout or not. For example, the system may defer to any vehicle that is moving within the roundabout and indicate to the operator when an opening in the roundabout is available and/or automatically enter the roundabout when space is available.

When the system determines that the equipped vehicle has the right-of-way (e.g., via object detection and tracking using the camera), the system provides an indication to the driver that the equipped vehicle has the right-of-way. For example, the system may provide a visual indication on a display within the vehicle and/or an audible indication (e.g., a buzzer or audible tone or the like). Optionally, for autonomously or semi-autonomously controlled vehicles, the control may control the vehicle (e.g., steering, acceleration, and braking) to move into the intersection when the equipped vehicle has the right-of-way.

In some implementations, the system continually updates the right-of-way order. For example, when another vehicle enters the intersection when that vehicle did not have the right-of-way, the right-of-way order may need to be updated to reflect a new order based on the remaining vehicles at the intersection. The updated order may be indicated to the driver (e.g., via a display).

Thus, implementations herein provide a system that intelligently stops a vehicle at an intersection with one or more stop signs. The system determines a right-of-way order of vehicles at the intersection and indicates to the driver when the equipped vehicle has the right-of-way, increasing the safety of the equipped vehicle while simultaneously reducing the stress of the driver.

The system may include a camera module mounted at an in-cabin side of a windshield of the equipped vehicle, with the camera module comprising a camera viewing through the windshield forward of the equipped vehicle and capturing image data. An electronic control unit (ECU) comprising electronic circuitry and associated software is disposed in the vehicle, with the electronic circuitry of the ECU comprising an image processor for processing image data captured by the camera. The ECU, as the vehicle is traveling along a traffic lane of a road, and responsive to processing by the image processor at the ECU of image data captured by the camera, determines presence of an intersection ahead of the equipped vehicle and being approached by the equipped vehicle. The determined intersection comprises at least one stop indicator, such as at least one stop sign or flashing red light or the like. As the equipped vehicle approaches the intersection, the ECU, via processing at the ECU of image data captured by the camera, determines presence of a particular stop indicator designated for the lane along which the equipped vehicle is traveling. Responsive at least in part to determining presence of the stop indicator, the vehicle arrives at and stops at the intersection. As the equipped vehicle approaches and arrives at the intersection, and responsive to processing at the ECU of image data captured by the camera, the ECU determines an order of arrival of vehicles arriving at the intersection relative to the arrival of the equipped vehicle at the intersection. The ECU determines a right-of-way order of vehicles at the intersection based on the determined order of arrival of vehicles at the intersection relative to the arrival of the equipped vehicle at the intersection. Based on the determined right-of-way order of vehicles at the intersection, and responsive to processing at the ECU of image data captured by the camera, the ECU determines when the equipped vehicle has the right-of-way at the intersection. Responsive to determining that the equipped vehicle has the right-of-way at the intersection, the ECU provides an indication to the driver of the equipped vehicle that the equipped vehicle has the right-of-way.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109;

6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like, to detect presence of and/or range to other vehicles and objects at the intersection. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
a camera module mounted at an in-cabin side of a windshield of a vehicle equipped with the vehicular vision system, the camera module comprising a camera viewing through the windshield forward of the equipped vehicle, the camera capturing image data;
an electronic control unit (ECU) comprising electronic circuitry and associated software;
a global positioning system (GPS) sensor disposed at the equipped vahicle, the GPS sensor capturing location data;
wherein the ECU, responsive to processing at the ECU of location data captured by the GPS sensor, determines map data associated with a current geographical location of the vehicle;
wherein the electronic circuitry of the ECU comprises an image processor for processing image data captured by the camera;
wherein the ECU, with the equipped vehicle stopped at an intersection of another road with a road being travelled on by the equipped vehicle, and responsive to processing at the ECU of image data captured by the camera, determines a right-of-way order of other vehicles at the intersection based on (i) a classification of the intersection and (ii) an order of arrival of the other vehicles at the intersection relative to the arrival of the equipped vehicle at the intersection, and wherein the classification of the intersection is based at least in part on the map data associated with the current geographical location of the vehicle;

wherein, based on the determined right-of-way order of the other vehicles at the intersection, and responsive to processing at the ECU of image data captured by the camera, the ECU determines when the equipped vehicle has the right-of-way at the intersection; and wherein, responsive to determining that the equipped vehicle has the right-of-way at the intersection, the ECU provides an indication to the driver of the equipped vehicle that the equipped vehicle has the right-of-way.

2. The vehicular vision system of claim 1, wherein the intersection comprises at least one stop indicator, and wherein the ECU, via processing at the ECU of image data captured by the camera, determines presence of a particular stop indicator designated for a traffic lane of the road along which the equipped vehicle is traveling.

3. The vehicular vision system of claim 2, wherein the ECU determines, via processing at the ECU of image data captured by the camera, presence of a stop line associated with the particular stop indicator designated for the traffic lane of the road along which the equipped vehicle is traveling, and wherein the ECU, responsive to determining presence of the stop line, controls the equipped vehicle to stop the equipped vehicle at the stop line.

4. The vehicular vision system of claim 3, wherein the ECU, responsive to determining presence of the particular stop indicator, classifies the intersection.

5. The vehicular vision system of claim 4, wherein the ECU classifies the intersection as one selected from the group consisting of (i) an all-stop intersection, (ii) a four-way intersection, (iii) a three-way intersection, (iv) a one-way intersection, and (v) a cross traffic does not stop intersection.

6. The vehicular vision system of claim 2, wherein the intersection comprises a four-way intersection, and wherein the intersection comprises four stop signs.

7. The vehicular vision system of claim 2, wherein the at least one stop indicator comprises at least one stop sign.

8. The vehicular vision system of claim 2, wherein the at least one stop indicator comprises at least one stop light.

9. The vehicular vision system of claim 2, wherein the ECU determines the presence of the particular stop indicator based on at least one selected from the group consisting of (i) a color of a sign at the intersection and (ii) a shape of a sign at the intersection.

10. The vehicular vision system of claim 1, comprising a display disposed within the equipped vehicle for displaying images, and wherein the indication comprises a visual indication displayed on the display.

11. The vehicular vision system of claim 1, wherein the indication comprises an audible indication.

12. The vehicular vision system of claim 1, comprising a display disposed within the equipped vehicle for displaying images, and wherein the ECU, responsive to determining the right-of-way order of vehicles at the intersection, visually indicates the determined right-of-way order to the driver using the display.

13. The vehicular vision system of claim 1, wherein the ECU, responsive to determining that the equipped vehicle has the right-of-way at the intersection, controls the equipped vehicle to enter the intersection.

14. The vehicular vision system of claim 1, wherein the intersection comprises at least one traffic lane that does not stop for the remaining traffic lanes.

15. A vehicular vision system, the vehicular vision system comprising:

a camera module mounted at an in-cabin side of a windshield of a vehicle equipped with the vehicular vision system, the camera module comprising a camera viewing through the windshield forward of the equipped vehicle, the camera capturing image data;

an electronic control unit (ECU) comprising electronic circuitry and associated software;

a global positioning system (GPS) sensor disposed at the equipped vehicle, the GPS sensor capturing location data;

wherein the ECU, responsive to processing at the ECU of location data captured by the GPS sensor, determines map data associated with a current geographical location of the vehicle;

wherein the electronic circuitry of the ECU comprises an image processor for processing image data captured by the camera;

wherein, as the equipped vehicle travels along a road and approaches and arrives at an intersection of another road with the road being traveled by the equipped vehicle, and responsive to processing at the ECU of image data captured by the camera, the ECU (i) classifies the intersection and (ii) determines an order of arrival of vehicles arriving at the intersection relative to the arrival of the equipped vehicle at the intersection, and wherein the classification of the intersection is based at least in part on the map data associated with the current geographical location of the vehicle;

wherein the ECU determines a right-of-way order of vehicles at the intersection based on (i) the classification of the intersection and (ii) the determined order of arrival of vehicles at the intersection relative to the arrival of the equipped vehicle at the intersection;

wherein, based on the determined right-of-way order of vehicles at the intersection, and responsive to processing at the ECU of image data captured by the camera, the ECU determines when the equipped vehicle has the right-of-way at the intersection; and wherein, responsive to determining that the equipped vehicle has the right-of-way at the intersection, the ECU provides an indication to the driver of the equipped vehicle that the equipped vehicle has the right-of-way.

16. The vehicular vision system of claim 15, wherein, as the equipped vehicle approaches an intersection ahead of the equipped vehicle and being approached by the equipped vehicle, the ECU, via processing at the ECU of image data captured by the camera, determines presence of a particular stop indicator designated for a traffic lane of the road along which the equipped vehicle is traveling, and wherein, responsive at least in part to determining presence of the stop indicator, the vehicle arrives at and stops at the intersection.

17. The vehicular vision system of claim 16, wherein the particular stop indicator comprises a stop sign.

18. The vehicular vision system of claim 16, wherein the ECU determines the presence of the particular stop indicator based on at least one selected from the group consisting of (i) a color of a sign at the intersection and (ii) a shape of a sign at the intersection.

19. A vehicular vision system, the vehicular vision system comprising:

a camera module mounted at an in-cabin side of a windshield of a vehicle equipped with the vehicular vision system, the camera module comprising a camera viewing through the windshield forward of the equipped vehicle, the camera capturing image data;

an electronic control unit (ECU) comprising electronic circuitry and associated software;

wherein the electronic circuitry of the ECU comprises an image processor for processing image data captured by the camera;

a global positioning system (GPS) sensor disposed at the equipped vehicle, the GPS sensor capturing location data;

wherein the ECU, responsive to processing at the ECU of location data captured by the GPS sensor, determines map data associated with a current geographical location of the vehicle;

wherein, with the equipped vehicle traveling along a road and approaching an intersection of another road with the road being travelled on by the equipped vehicle, and with the intersection comprising at least one stop indicator, the ECU, via processing at the ECU of image data captured by the camera, (i) determines presence of a particular stop indicator designated for a traffic lane of the road along which the equipped vehicle is traveling and (ii) classifies the intersection, and wherein the classification of the intersection is based at least in part on the map data associated with the current geographical location of the vehicle;

wherein the ECU, responsive to processing at the ECU of image data captured by the camera, determines a right-of-way order of other vehicles at the intersection based on (i) the classification of the intersection and (ii) an order of arrival of the other vehicles at the intersection relative to the arrival of the equipped vehicle at the intersection;

wherein, based on the determined right-of-way order of the other vehicles at the intersection, and responsive to processing at the ECU of image data captured by the camera, the ECU determines when the equipped vehicle has the right-of-way at the intersection;

wherein, responsive to determining that the equipped vehicle has the right-of-way at the intersection, the ECU provides a visual indication to the driver of the equipped vehicle that the equipped vehicle has the right-of-way; and wherein the ECU, responsive to determining that the equipped vehicle has the right-of-way at the intersection, controls the equipped vehicle to enter the intersection.

20. The vehicular vision system of claim 19, wherein the ECU, responsive to determining presence of the particular stop indicator, determines, via processing at the ECU of image data captured by the camera, presence of a stop line associated with the particular stop indicator designated for the traffic lane of the road along which the equipped vehicle is traveling, and wherein the ECU, responsive to determining presence of the stop line, controls the equipped vehicle to stop the equipped vehicle at the stop line.

* * * * *

UNITED STATES PATENT AND TRADEMARK OFFICE
CERTIFICATE OF CORRECTION

| | | |
|---|---|---|
| PATENT NO. | : 12,036,990 B2 | Page 1 of 1 |
| APPLICATION NO. | : 16/949920 | |
| DATED | : July 16, 2024 | |
| INVENTOR(S) | : Harold E. Joseph et al. | |

It is certified that error appears in the above-identified patent and that said Letters Patent is hereby corrected as shown below:

In the Claims

Column 8
Claim 1, Line 52, "equipped vahicle" should be --equipped vehicle--

Column 9
Claim 1, Line 13, "to the driver" should be --to a driver--

Column 10
Claim 15, Line 47, "to the driver" should be --to a driver--

Column 12
Claim 19, Line 14, "to the driver" should be --to a driver--

Signed and Sealed this
Thirteenth Day of August, 2024

Katherine Kelly Vidal
*Director of the United States Patent and Trademark Office*